United States Patent
Gomez Cordon et al.

(10) Patent No.: US 10,501,852 B2
(45) Date of Patent: Dec. 10, 2019

(54) FORMULATION FOR THE ETCHING OF POLYMER MATERIALS PRIOR TO COATING OF THE MATERIALS

(71) Applicant: AVANZARE INNOVACIÓN TECNOLÓGICA, S.L., Navarrete (la Rioja) (ES)

(72) Inventors: Julio Gomez Cordon, Navarrete (ES); Luis Otaño Jimenez, Navarrete (ES); Javier Perez Martinez, Navarrete (ES)

(73) Assignee: AVANZARE INNOVACIÓN TECNOLÓGICA, S,L., Navarrete (La Rioja) (ES)

( * ) Notice: Subject to any disclaimer, the term of this patent is extended or adjusted under 35 U.S.C. 154(b) by 0 days.

(21) Appl. No.: 16/226,606

(22) Filed: Dec. 19, 2018

(65) Prior Publication Data

US 2019/0136381 A1    May 9, 2019

Related U.S. Application Data

(63) Continuation of application No. PCT/ES2018/070575, filed on Aug. 28, 2018.

(30) Foreign Application Priority Data

Sep. 28, 2017 (ES) .................................. 201731155

(51) Int. Cl.
| | | |
|---|---|---|
| *C23C 18/24* | (2006.01) | |
| *C23C 18/16* | (2006.01) | |
| *C23C 18/20* | (2006.01) | |
| *C23C 18/30* | (2006.01) | |
| *C23C 18/28* | (2006.01) | |
| *C23C 18/32* | (2006.01) | |
| *C23C 18/38* | (2006.01) | |

(52) U.S. Cl.
CPC .......... *C23C 18/24* (2013.01); *C23C 18/1653* (2013.01); *C23C 18/2086* (2013.01); *C23C 18/28* (2013.01); *C23C 18/30* (2013.01); *C23C 18/32* (2013.01); *C23C 18/38* (2013.01); *C23C 2222/10* (2013.01)

(58) Field of Classification Search
CPC ..... C23C 18/24; C23C 18/28; C23C 2222/10; C23C 18/1653; C23C 18/2086; C23C 18/30; C23C 18/32; C23C 18/38
See application file for complete search history.

(56) References Cited

U.S. PATENT DOCUMENTS

| | | | |
|---|---|---|---|
| 2,748,069 A * | 5/1956 | Iexi .......................... | C25D 3/06 205/285 |
| 3,900,689 A | 8/1975 | Deyrup | |
| 4,568,571 A | 2/1986 | Sirinyan et al. | |
| 5,180,639 A * | 1/1993 | Zarnoch ..................... | C08J 7/12 205/167 |
| 5,962,073 A | 10/1999 | Timmer | |
| 6,559,242 B1 | 5/2003 | Ball et al. | |
| 8,603,352 B1 | 12/2013 | Zhang-Beglinger et al. | |
| 2007/0099425 A1* | 5/2007 | Schildmann ........... | C09K 13/08 438/689 |
| 2009/0023011 A1* | 1/2009 | Chaffins .................. | B32B 37/24 428/656 |
| 2013/0186774 A1 | 7/2013 | Pearson et al. | |

FOREIGN PATENT DOCUMENTS

| | | |
|---|---|---|
| DE | 19740431 C1 | 11/1998 |
| EP | 0081129 A1 | 6/1983 |
| ES | 2282278 T3 | 10/2007 |

OTHER PUBLICATIONS

Randall E. Hamm et al. "Complex Ions of Chromium. III. Reactions between Hexaquochromium(III) and Oxalate Ions", Journal American Chemical Society, 1953, vol. 75, pp. 3085-3089.
Sharon Olivera et al., "Plating on acrylonitrile—butadiene—styrene (ABS) plastic review" Journal of Materials Science, 2016, vol. 51, pp. 3657-3674.
Dimitri Del Pianta et al. "Determination of the chromium(III) reduction mechanism during chromium electroplating", Electrochimica Acta, 2018, vol. 284, pp. 234-241.
IUPAC Gold Book, Thermosetting Polymer, PAC, 2004, vol. 76, pp. 1.
James E. Tackett "Characterization of Chromium(III) Acetate in Aqueous Solution", 1989, vol. 43, No. 3, pp. 490-499.
Randall E. Hamm "Complex Ions of Chromium. IV. The Ethylenediaminetetraacetic Acid Complex with Chromium(III)", Jun. 8, 1953, vol. 75, pp. 5670-5672.
Roberto Giovanardi et al. "Chromium electrodeposition from Cr(III) aqueous solutions", Surface & Coatings Technology, 2011, vol. 205, pp. 3947-3955.
Serope Kalpakjian et al. Manufacturing Engineering and Technology, Fourth Edition, Additives in Plastics, 2002, pp. 109-110.

(Continued)

*Primary Examiner* — James M Mellott
(74) *Attorney, Agent, or Firm* — Cantor Colburn LLP

(57) ABSTRACT

A new formulation of treatment baths for the etching of polymers prior to metallization or coating of the polymer using known technologies described in the state of the art, which are based on the use of salts and/or complexes of the Cr(III) cation, where the formulation includes a salt and/or Cr(III) complex in which the Cr(III) is coordinated to at least one or several mono, bi, tri, tetra, penta, hexadentate or bridging ligands that are coordinated to the chromium by the oxygen, sulfur or nitrogen atom or several of these atoms of the ligands, such that after the polymer piece has been etched with the Etching formulation described above, the metal coating is carried out by means of the application of chemical and electrolyte baths in the case of metallization, or by means of the application of paint or another organic coating.

9 Claims, No Drawings

(56) References Cited

OTHER PUBLICATIONS

Silvia Magnolis Vargas-Vasquez et al. "Characterization of Cr(III) and Cr(III) Acetate Aqueous Solutions Using UV-VIS Spectrophotometry and H NMR", Chemical Engineering Communications, 2010, vol. 197, pp. 491-505.

Wikipedia "Thermostability", Feb. 12, 2019, pp. 1-5, http://en.wikipedia.org/wiki/Thermostability.

* cited by examiner

FORMULATION FOR THE ETCHING OF POLYMER MATERIALS PRIOR TO COATING OF THE MATERIALS

CROSS REFERENCE TO RELATED APPLICATION

This application is a continuation of International Patent Application Number PCT/ES2018/070575 filed on Aug. 28, 2018 claiming priority to Spanish Patent Application Number 201731155 filed on Sep. 28, 2017, the contents of which said applications are incorporated herein by reference in their entirety.

TECHNICAL FIELD

The present disclosure relates to treatment baths for the etching of polymers prior to metallization or coating of the polymer using known technologies described in the state of the art, which are based on the use of salts and/or complexes of the Cr(III) cation.

BACKGROUND

Currently, the technological development and industrial applications of pretreatment, treatment and etching baths of polymers, mainly ABS and its mixtures such as ABS-Polycarbonate, Polyamide, polypropylene and thermoset polymers, with or without the addition of inorganic fillers and other additives in the mass of the polymer are based on the use of aqueous baths that contain chromium salts in oxidation state VI. The baths generally contain sulfuric acid and a chromium (VI) compound, mainly chromic acid, chromium trioxide or dichromates in a concentration of up to 400 gr/l.

This process of surface treatment or etching is the initial key treatment and a system of multiple functional layers of activation, acceleration, deposition of chemical nickel, copper, electrodeposition of copper, nickel and even final chrome plated finish, with their corresponding intermediate washes are then applied, thus obtaining a piece of plastic that has been metallized on its surface.

In the case of organic or painted coatings, after the initial key process of etching surface treatment described above, the plastic is coated or painted using one of the different methods that currently exist in the state of the art.

Only the combination of a suitable pre-treatment or etching, and several optimal subsequent treatments provide all of the necessary key requirements for the respective required applications, with the initial etching treatment being the fundamental factor of the whole process.

The chromium salts in oxidation state VI used in etching have been shown to be toxic and carcinogenic to humans, which generated interest in the substitution of the use of said chromium (VI) salts with any use of these salts and specifically for their use in polymer etching and treatment baths.

Different options have been proposed for the replacement of baths containing Cr(VI) salts with other chemical oxidants, mainly Mn (VII) salts, Mn (VI) salts and even Mn (III) salts, both in an acid medium and in a basic medium, as shown in patents U.S. Pat. No. 8,603,352 B1, US20130186774.

However, these systems based on Mn salts do not produce the same adhesion results in the subsequent metallization or coating of the polymer pieces and require very complex washes due to the need to eliminate the products of the reduction of the Mn salts, with the baths also being unstable over time and with short duration for industrial applications.

Alternatively, systems based on hydrogen peroxide as in DE19740431 C1, iron and/or copper salts and peroxides as in U.S. Pat. No. 6,559,242 B1, anionic complexes with transition metal chloride ligand U.S. Pat. No. 4,568,571 A, organometallic complexes of transition metals in organic solvent EP0081129 A1, salts of transition metal chlorides or nitrates without the use of complexes in slightly acidic aqueous medium US20070099425 A1, have been proposed.

In no case has it currently been possible to obtain results applicable to the final adhesion requirements that are demanded by the automotive sector among others and that are achieved through treatments based on Cr(VI) salts. A review article was recently published on this subject: "*Plating on acrylonitrile—butadiene—styrene (ABS) plastic: a review* Journal of Materials Science 2016, 51, 3657-3674", Therefore, there is a need in the state of the art to have etching baths that are efficient in terms of adhesion results of metallization or coatings of other types on the polymer, stability of the bath over time and use, safety characteristics, non-toxicity for people and for the environment, ease of recovery, recycling or disposal under environmentally appropriate conditions of said treatment baths and free of Cr(VI).

BRIEF SUMMARY

The disclosure provides the pretreatment, treatment and/or etching of polymers by means of the use of aqueous solutions containing salts and/or chromium (III) complexes in an acid medium.

The disclosure is based on the use of the Cr(III) cation added as a salt and chemically coordinated to at least one or several mono, bi, tri, tetra, penta, hexadentate or bridging ligands that are coordinated to the chromium by the oxygen, sulfur or nitrogen atom.

The treatment is applied on organic polymers for the purpose of modifying their surfaces from both the physical and chemical points of view, such that a coating that shows adhesion may be applied on the surface of the polymer or that the surface of the polymer may be metallized by means of technologies currently described in the state of the art.

DETAILED DESCRIPTION

The coating of polymers by metals by means of chemical baths or by organic coatings requires a preliminary etching treatment so that the surface of the polymer to be coated provides adhesion that meets the application requirements of the product that is ultimately obtained.

The polymers on which this etching treatment process is used are thermoplastics such as ABS, blends of ABS with other polymers such as polycarbonate, polyamide, PVC, polycarbonate, polyesters, polyacetal, polyolefins, thermoset polymers such as epoxy resins, unsaturated polyester resins, resins of epoxy vinyl ester or elastomers such as SBR rubber, EPDM or thermoplastic elastomers of the different types that exist in the market. The polymers may contain different types of inorganic fillers such as quartz, calcium carbonate, wollastonite, silicates, talc and the corresponding additives necessary for processing by extrusion, injection, molding on hot plates, or the different techniques used to manufacture objects, sheets or shapes out of thermoset materials or elastomers.

The polymer surface treatment or etching process is a process that requires several pre-requisites, several compositions of the treatment or etching baths and the action or treatment of these baths at controlled temperatures and times.

Prerequisites of the Etching Process

The surface of the substrate to be treated initially must be free of contaminants, grease, corrosive products and other materials, so adequate preparation of the base substrate is therefore an advisable requirement of the process, although it is not strictly necessary. The prior preparation of the substrate is known in the state of the art.

The compositions of the baths to be used in the etching process are aqueous baths:

The baths are prepared by adding chromium (III) complexes or salts and are based on the use of at least one or several mono, bi, tri, tetra, penta, hexadentate or bridging ligands that are coordinated to the chromium by the oxygen, sulfur or nitrogen atom of the ligand.

Among others, the possible ligands to be used for chromium in oxidation state (III) are formate, acetate, propanoate, butanoate, benzoate, phenylacetate, phenylpropionate, cyanamate, alkylbenzoates, pyruvate, levulinate, citrate, isocitrate, aconitate, trimellitate, glycinate, valinate, leucinate, threoninate, lysinate, tryptophanate, histidinate, phenylalaninate, isoleucinate, argininate, methioninate, alaninate, prolinate, serinate, cysteinate, asparaginate, glutaminate, tyrosinate, aspartate, polyaspartate, glutamate, cysteinate, homocysteinate, ornithinate, nicotinate, oxalate, propanedioate, butanedioate, pentanedioate, hexanedioate, maleate, fumarate, phthalate, isophthalate, terephthalate, tartrate, itaconate, mesaconate, citraconate, glycolate, lactate, mandelate, salicylate, gluconate, ethylenediaminetetraacetate, nitrilotriacetate, iminodisuccinate, ethyienediaminedisuccinate, methylglycine diacetate, N,N,diacetate glutamate, cyclohexylenedinitrilotetraacetate, diethylenetriaminepentaacetate, aminoethyl ethylene glycol tetraacetate, triethylenetetramine hexaacetate, dihydroxyethylglycinate, thinodiacetate, oxamate, nitrilotripropionate, ethylenediamine dipropionate, thiodipropionate, dithiodipropionate, aminopropanoate, aminopentanoate, aminohexanoate, 2-aminobenzoate, 3-aminobenzoate, 4-aminobenzoate, 3-cyclohexylamino-propylamine, ethylenediamine, 1,3-diaminopropane, dimethylaminopropylamine, diethylaminopropylamine, bis(3-aminopropyl)-methylamine, diethylenetriamine, dipropylenetriamine, triethylenetetramine, tetraethyienepentamine, polyamines, 3-(2-aminoethyljamino-propylamine, N,N'-bis(3-aminopropyl) ethylenediamine, neopentanediamine, cyclohexanediamine, hexane-1,6-diamine, imidazole, 1-methylimidazoie, 2-methylimidazole, 1,2-dimethylimidazole, 2-ethylimidazole, 2-ethyl-4-methyl-imidazole, N-(3-Aminopropyl)-imidazole, pyrazole, niacinamide, bipyridine, phenanthroline or mixtures thereof.

The ligands used are preferably formate, acetate, propionate, glycinate, argininate, aspartate, polyaspartate, glutamate, nicotinate, oxalate, propanedioate, butanedioate, pentanedioate, hexanedioate, maleate, fumarate, phthalate, salicylate, tartrate, citrate, glycolate, lactate, gluconate, ethylenediaminetetraacetate, nitrilotriacetate, 2-aminobenzoate. The ligands most preferably used are oxalate, propanedionate, butanedionate, maleate, fumarate, phthalate, glycolate, lactate, salicylate, glycinate, glutamate or mixtures thereof.

The chromium (III) complexes contained in the bath may be supplied to the bath in the form of chromium (III) complex prepared and isolated from the above ligands, as indicated in the scientific literature, for example, for oxalate complexes in "Complex Ions of Chromium. III. Reactions between Hexaquochromium(III) and Oxalate Ions" Randall E. Hamm, Robert E. Davis J. Am. Chem. Soc., 1953, 75, pp 3085-3089 (1953).

The Cr(III) complexes may also be formed in situ in the bath by separately adding a salt of chromium (III) and of the ligand that will form the required complex as indicated for example for fumarate complexes in the U.S. Pat. No. 3,900,689.

In the case of in situ formation of the chromium (III) complex, the initial salts of these complexes may be inorganic anion salts or organic anion salts such as: Chloride, bromide, perchlorate, hydroxide, oxides, sulfate, sulfite, sulfide, nitrate, nitrite, phosphate, diphosphate, metaphosphates, polyphosphates, borate, silicate, formate, acetate, benzoate, lactate, methanesulfonate, ethanesulfonate, propanesulfonate, butanesulfonate, carboxylates, alkyl phosphates or mixtures thereof. Once these salts are added to the aqueous bath, the corresponding ligand or ligands are added to this bath in their protonated form or in the form of alkali metal or alkaline earth metal salts or free form, necessary to form the complex. In this way, the chromium (III) complex required in the etching bath is obtained.

Finally, it is also possible to obtain the necessary Cr(III) complex in the etching bath by chemical reaction of the ligand to be used or a reduced form of the ligand to be used and the addition of a Cr(VI) compound to the bath, which is reduced to a complex in oxidation state (III) either by direct action of the ligand with which it is intended to form the complex if it is the reducing agent, or by the addition of a reducing agent other than the ligand such as ascorbic acid, ascorbates, thiosulfates, sulfites, sulfides, nitrites, phosphites, hypophosphites, formaldehyde sulfoxylates, dithionites, oxalates, carboxylates of alkali or alkaline earth metals, hydrazine and its derivatives, hydroxylamine, or any other reducing agent known in the state of the art.

The concentration of the Cr(III) complex present in the bath may be between 2 mM and 2 M and more preferably between 5 mM and 1 M and even more preferably between that of 0.01 M and 0.4 M.

The indicated Cr(III) complexes are used in acidic aqueous medium and the acids contained in the etching bath may be sulfuric acid, aminosulfuric (sulfamic) acid, phosphoric acid, diphosphoric acid, metaphosphoric acid, polyphosphoric acid, methanesulfonic acid, acid ethanesulfonic acid, propanesulfonic acid, butanesulfonic acid, alcane sulfonic acids, benzenesulfonic acid, toluenesulfonic acid, cumenesulfonic acid, alkylbenzenesulfonic acids, monoalkylphosphoric acids, dialkylphosphoric acids, isethionic acid, perchioric acid, chloric acid, nitric acid, trifluoromethanesulfonic acid, trifluoroacetic acid, tetrafluoroboric acid, hexafluorophosphoric acid, hexafluorosilicic acid, hydrofluoric acid, boric acid or mixtures thereof. Preferably the acids present in the etching bath may be sulfuric acid, phosphoric acid, diphosphoric acid, metaphosphoric acid, polyphosphoric acids, methanesulfonic acid, ethanesulfonic acid, propanesulfonic acid, benzenesulfonic acid, toluenesulfonic acid, cumenesulfonic acid, alkylbenzenesulfonic acids, monoalkylphosphoric acids, dialkylphosphoric acids or the mixtures thereof and more preferably the acids present in the bath may be sulfuric acid, phosphoric acid or mixtures thereof.

The acid concentration in the etching bath may be from 10% up to 98%, preferably between 40% and 95% and more preferably between 55% and 92% considering the total acid content in mass/mass percentage, with the rest being Cr(III)

complexes and water. This totality of acid may be formed by the mixture of two or more acids.

The temperature of use of the etching bath may vary between 10° C. and 95° C., more preferably between 15° C. and 80° C. and even more preferably between 20° C. and 75° C. To achieve working temperatures, the treatment tanks are heated or cooled to maintain the optimum working temperature by applying any technology suitable for this purpose.

The polymer pieces of any shape and dimensions to be treated by the etching bath are immersed in the bath for a time comprised between 30 seconds and one hour or preferably between 1 minute and 45 minutes, or more preferably between 2 minutes and 30 minutes.

After the etching process to which the present disclosure refers, the necessary washing steps are carried out with water, aqueous solutions or organic liquids with characteristics known in the current state of the art.

After washing, the necessary processes are carried out to obtain the metallic coating by means of a chemical bath with the required characteristics, by means of wet processes.

Alternatively, after the washing, the pieces may or may not be dried if polymer coatings such as varnishes or paints are to be applied to the treated pieces.

EXAMPLES

The substrates used that are referred to in the following examples are substrates obtained by injection of the corresponding thermoplastic polymer: ABS, ABS-polycarbonate, polyamide 6, polyamide 6 with 20% inorganic filler wollastonite, polypropylene or polypropylene with inorganic filler 20% talc.

In the case of thermoset substrates, the curing of the substrates is carried out by methods known in the state of the art and they are: unsaturated polyester resin with 40% glass fiber and epoxy resin with 40% glass fiber.

In all cases, the substrate is washed prior to etching. The washing is done by immersion in a water bath, bath of 1% sodium dodecylsulfate aqueous solution and two subsequent rinses by immersion in two water baths. The pre-washing is intended to remove dirt and grease from the substrates and/or prepare the surface for etching. Depending on the process of preparation of the pieces, this washing may be dispensed with.

The etching treatment is carried out with the corresponding baths that are presented in the following examples.

After the etching process, two successive rinses are carried out by immersion in water baths.

Once the polymer has been etched, the deposition of autocatalytic chemical nickel, also known as chemical nickel, is carried out by means of a process known in the state of the art:

Treatment by immersion in an activator bath at 25° C. for 2 minutes. Rinse in a water bath. Treatment in an accelerator bath at 25° C. for 2 minutes. Rinse in a water bath. Immersion bath for chemical nickel plating at 29° C. for 8 min. Two washes by immersion in a water bath.

Similarly, once the etching and drying of the substrates have been carried out, the coating of the polymer is carried out by means of an organic-based coating or paint.

Example 1

As a reference on the results obtained in the Etching process, the etching is carried out in a bath based on the use of Cr(VI) salts with the following composition:

The etching bath contains 380 gr/L of chromic acid and 400 g/L of concentrated sulfuric acid.

The pieces to be etched are placed into the bath for 3 minutes at a temperature of 25° C.

Example 2

Etching bath based on Cr(III) salts, in which the ligand that is coordinated to the chromium is acetate and which is prepared by means of a solution of 62% $H_2O$; 4% chromium (III) acetate; 34% $H_2SO_4$;

The pieces to be etched are placed into the bath for 3 minutes at a temperature of 25° C.

Example 3

Etching bath based on Cr(III) salts, in which the ligand that is coordinated to the chromium is benzoate and which is prepared by means of a solution of 40% $H_2O$; 3% chromium (III) benzoate; 57% methanesulfonic acid;

The pieces to be etched are placed into the bath for 3 minutes at a temperature of 25° C.

Example 4

Etching bath based on Cr(III) salts, in which the ligand that is coordinated to the chromium is glycinate and which is prepared by means of a solution of 21% $H_2O$; 2.5% chromium (III) glycinate; 65.5% $H_2SO_4$;

The pieces to be etched are placed into the bath for 3 minutes at a temperature of 25° C.

Example 5

Etching bath based on Cr(III) salts, in which the ligand that is coordinated to the chromium is aminohexanoate and which is prepared by a solution of 21% $H_2O$; 2.2% $CrCl_3 \cdot 6H_2O$; 1.3% aminohexanoic acid; 36.5% $H_3PO_4$ (75% in water); 39% $H_2SO_4$;

The pieces to be etched are placed into the bath for 3 minutes at a temperature of 25° C.

Example 6

Etching bath based on Cr(III) salts, in which the ligand that is coordinated to chromium is citrate and which is prepared by means of a solution of 17% $H_2O$; 1.2% $Cr(NO_3)$ 17% $H_2O$; 1.2% $Cr(NO_3)_3 \cdot 9H_2O$, 2.6% citric acid; 39.7% $H_3PO_4$ (75% in water); 39.5% $H_2SO_4$;

The pieces to be etched are placed into the bath for 3 minutes at a temperature of 25° C.

Example 7

Etching bath based on Cr(III) salts, in which the ligand that is coordinated to chromium is triethylenetetramine and which is prepared by a solution of 19% $H_2O$; 0.8% $Cr(NO_3)_3 \cdot 9H_2O$, 1.1% triethylenetetramine; 38.4% $H_3PO_4$ (75% in water); 40.7% $H_2SO_4$;

The pieces to be etched are placed into the bath for 3 minutes at a temperature of 25° C.

Example 8

Etching bath based on Cr(III) salts, in which the ligand that is coordinated to chromium is thiodipropionate and which is prepared by a solution of 18.5% $H_2O$; 0.7%

$CrCl_3 \cdot 6H_2O$; 0.9% thiodipropionic acid; 38% $H_3PO_4$ (75% in water); 41.9% $H_2SO_4$. The pieces to be etched are placed into the bath for 3 minutes at a temperature of 25° C.

Example 9

Etching bath based on Cr(III) salts, in which the ligand that coordinates to chromium is ethylenediaminetetraacetate (EDTA) and which is prepared by a solution of 18% $H_2O$; 0.6% $Cr(NO_3)_3 \cdot 9H2O$, 0.3% ethylenediaminetetraacetic acid; 39.7% $H_3PO_4$ (75% in water); 41.4% $H_2SO_4$. The pieces to be etched are introduced in the bath for 3 minutes at a temperature of 25° C.

Example 10

Etching bath based on Cr(III) salts, in which the ligand that is coordinated to chromium is ethylenediaminetetraacetate (EDTA) and which is prepared by means of a solution of 18.3% $H_2O$; 0.6% $Cr(NO_3)_3 \cdot 9H_2O$, 0.5% disodium salt of ethylenediaminetetraacetic acid; 39.2% $H_3PO_4$ (75% in water); 41.4% $H_2SO_4$. The pieces to be etched are placed into the bath for 3 minutes at a temperature of 25° C.

Example 11

Etching bath based on Cr(III) salts, in which the ligand that is coordinated to chromium is ethylenediaminetetraacetate (EDTA) and which is prepared by a solution of 18% $H_2O$; 0.6% $Cr(NO_3)_3 \cdot 9H_2O$, 0.3% ethylenediaminetetraacetic acid; 39.7% $H_3PO_4$ (75% in water); 41.4% $H_2SO_4$. The pieces to be etched are placed into the bath for 3 minutes at a temperature of 40° C.

Example 12

Etching bath based on Cr(III) salts, in which the ligand that coordinates to chromium is ethylenediaminetetraacetate (EDTA) and which is prepared by a solution of 18% $H_2O$; 2% $Cr(NO_3)_3 \cdot 9H_2O$, 1% ethylenediaminetetraacetic acid; 35.5% methanesulfonic acid (75% in water); 43.5% $H_2SO_4$. The pieces to be etched are placed into the bath for 3 minutes at a temperature of 25° C.

Example 13

Etching bath based on Cr(III) salts, in which the ligand that coordinates to chromium is fumarate and which is prepared by means of a solution of 18% $H_2O$; 0.6% $Cr(NO_3)_3 \cdot 9H_2O$, 0.3% fumaric acid; 39.7% $H_3PO_4$ (75% in water); 41.4% $H_2SO_4$. The pieces to be etched are placed into the bath for 3 minutes at a temperature of 25° C.

Example 14

Etching bath based on Cr(III) salts, in which the ligand that is coordinated to chromium is oxalate composed of a solution of 18% $H_2O$; 0.9% $Cr(NO_3)_3 \cdot 9H_2O$, 0.6% oxalic acid $H_2C_2O_4 \cdot 2H_2O$, 39.7% $H_3PO_4$; 40.8% $H_2SO_4$. The pieces to be etched are placed into the bath for 3 minutes at a temperature of 25° C.

Example 15

Etching bath based on Cr(III) salts, in which the ligand that is coordinated to chromium is oxalate composed of a solution of 17.7% $H_2O$; 1.2% $Cr(NO_3)_3 \cdot 9H_2O$, 0.6% oxalic acid $H_2C_2O_4 \cdot 2H_2O$, 39.7% $H_3PO_4$ (75%); 40.8% $H_2SO_4$. The pieces to be etched are placed into the bath for 15 minutes at a temperature of 25° C.

Example 16

Etching bath based on Cr(III) salts, in which the ligand that coordinates to chromium is salicylate and which is prepared by a solution of 18% $H_2O$; 0.6% $Cr_2O_3$; 0.8% salicylic acid; 39.7% $H_3PO_4$ (75% in water); 40.9% $H_2SO_4$. The pieces to be etched are placed into the bath for 3 minutes at a temperature of 25° C.

Example 17

Etching bath based on Cr(III) salts, in which the ligand that coordinates to chromium is salicylate and which is prepared by a solution of 18% $H_2O$; 0.6% $Cr_2O_3$; 0.8% salicylic acid; 39.7% $H_3PO_4$ (75% in water); 40.9% $H_2SO_4$. The pieces to be etched are placed into the bath for 3 minutes at a temperature of 60° C.

Example 18

Etching bath based on Cr(III) salts, in which the ligand that coordinates to chromium is gluconate and which is prepared by means of a solution of 18% $H_2O$; 0.6% $Cr_2(SO_4)_3 \cdot H_2O$; 2% sodium gluconate; 38% $H_3PO_4$ (75% in water); 41.4% $H_2SO_4$;

The pieces to be etched are placed into the bath for 3 minutes at a temperature of 25° C.

The metallized pieces are subjected to the Adhesion test by the lattice-cut test (ISO 2409), which is one of the methods commonly used to determine the adhesion of coatings on polymers. The adhesion result is evaluated from 0 to 5, 0 being an excellent adhesion and the peeling method following DIN 53494.

The adhesion results of the metallic layer obtained after the etching and metallization of the pieces are shown in the following table:

| EXAMPLE BATH | POLYMER | ISO 2409 | AVERAGE FORCE PER N/cm |
|---|---|---|---|
| Example bath 1 | ABS | 0 | 8.5 |
| Example bath 1 | ABS-polycarbonate | 0 | 4.3 |
| Example bath 1 | Polyamide 6 | 1 | 2.2 |
| Example bath 1 | Polyamide 6 with 20% wollastonite | 0 | 3.2 |
| Example bath 1 | Polypropylene | 4 | 0.4 |
| Example bath 1 | Polypropylene filler 20% talc | 4 | 0.6 |
| Example bath 1 | Unsaturated fiberglass polyester | 1 | 2.1 |
| Example bath 1 | Epoxy fiberglass | 0 | 3.1 |
| Example bath 2 | ABS | 0 | 7.4 |
| Example bath 2 | ABS Polycarbonate | 0 | 3.8 |
| Example bath 3 | ABS | 0 | 8.1 |
| Example bath 3 | ABS Polycarbonate | 0 | 4.2 |
| Example bath 4 | ABS | 0 | 7.9 |
| Example bath 4 | ABS-polycarbonate | 0 | 4.4 |
| Example bath 4 | Polyamide 6 | 2 | 1.6 |
| Example bath 4 | Polyamide 6 with 20% wollastonite | 1 | 2.5 |
| Example bath 5 | Unsaturated fiberglass polyester | 2 | 1.3 |
| Example bath 5 | Epoxy fiberglass | 0 | 4.7 |
| Example bath 6 | ABS | 0 | 7.3 |
| Example bath 7 | ABS | 0 | 6.9 |

-continued

| EXAMPLE BATH | POLYMER | ISO 2409 | AVERAGE FORCE PER N/cm |
|---|---|---|---|
| Example bath 8 | ABS | 0 | 6.6 |
| Example bath 9 | Polypropylene 20% talc | 3 | 0.9 |
| Example bath 10 | Polypropylene 20% talc | 3 | 0.8 |
| Example bath 11 | Polypropylene 20% talc | 4 | 0.6 |
| Example bath 12 | Polypropylene 20% talc | 4 | 0.5 |
| Example bath 13 | ABS | 0 | 8.2 |
| Example bath 14 | ABS | 0 | 8.0 |
| Example bath 14 | ABS Polycarbonate | 0 | 4.9 |
| Example bath 14 | Polyamide 6 with 20% wollastonite | 0 | 3.7 |
| Example bath 14 | Polypropylene filler 20% talc | 3 | 1.0 |
| Example bath 15 | ABS | 0 | 7.9 |
| Example bath 16 | ABS | 0 | 7.5 |
| Example bath 17 | ABS | 0 | 7.5 |
| Example bath 18 | ABS | 0 | 7.7 |

The parts coated with paint or organic coating are prepared after treatment in the bath by drying in an air stream at 40° C. for 2 hours and subsequent coating by airbrush. The paint used is a standard paint called 100% solids based on triethylene glycol diacrylate and UV cured, applied according to the manufacturer's recommendations.

The adhesion results of the paint submitted to the ISO2409 test:

| EXAMPLE BATH | POLYMER | ISO 2409 |
|---|---|---|
| Example bath 1 | Polypropylene 20% talc | 3 |
| Example bath 2 | Polypropylene 20% talc | 3 |
| Example bath 3 | Polypropylene 20% talc | 3 |
| Example bath 10 | Polypropylene 20% talc | 3 |
| Example bath 11 | Polypropylene 20% talc | 3 |

The invention claimed is:

1. A method of acid etching a thermoplastic, thermoset or elastomeric polymer material, the method comprising:
    etching the thermoplastic, thermoset or elastomeric polymer material with an etching bath comprising an acid and Cr(III) coordination complexes, wherein the acid concentration in the etching bath is from 20 wt. % to 98 wt. %; and
    applying a metallization coating or organic coating to the etched thermoplastic, thermoset or elastomeric polymer material.

2. The method according to claim 1, wherein the Cr (III) coordination complexes comprise one or more ligands selected from mono, bi, tri, tetra, penta, hexadentate or bridging ligands that are coordinated to the chromium by an oxygen, sulfur or nitrogen atom or a combination thereof.

3. The method according to claim 2, wherein the ligands are selected from formate, acetate, propanoate, butanoate, benzoate, phenylacetate, phenylpropionate, cyanamate, alkylbenzoates, pyruvate, levulinate, citrate, isocitrate, aconitate, trimellitate, glycinate, valinate, leucinate, threoninate, lysinate, tryptophanate, histidinate, phenylalaninate, isoleucinate, argininate, methioninate, alaninate, prolinate, serinate, cysteinate, asparaginate, glutaminate, tyrosinate, aspartate, polyaspartate, glutamate, cysteinate, homocysteinate, ornithinate, nicotinate, oxalate, propanedioate, butanedioate, pentanedioate, hexanedioate, maleate, fumarate, phthalate, isophthalate, terephthalate, tartrate, itaconate, mesaconate, citraconate, glycolate, lactate, mandelate, salicylate, gluconate, ethylenediaminetetraacetate, nitrilotriacetate, iminodisuccinate, ethylenediaminedisuccinate, methylglycine diacetate, N,N,diacetate glutamate, cyclohexylenedinitrilotetraacetate, diethylenetriaminepentaacetate, aminoethyl ethylene glycol tetraacetate, triethylenetramine hexaacetate, dihydroxyethylglycinate, iminodiacetate, oxamate, nitrilotripropionate, ethylenediamine dipropionate, thiodipropionate, dithiodipropionate, aminopropanoate, aminopentanoate, aminohexanoate, 2-aminobenzoate, 3-aminobenzoate, 4-aminobenzoate, 3-cyclohexylamino-propylamine, ethylenediamine, 1,3-diaminopropane, dimethylaminopropylamine, diethylaminopropylamine, bis(3-aminopropyl)-methylamine, diethylenetriamine, dipropylenetriamine, triethylenetetramine, tetraethylenepentamine, polyamines, 3-(2-aminoethyl) amino-propylamine, N,N'-bis(3-aminopropyl)ethylenediamine, neopentanediamine, cyclohexanediamine, hexane-1,6-diamine, imidazole, 1-methylimidazole, 2-methylimidazole, 1,2-dimethylimidazole, 2-ethylimidazole, 2-ethyl-4-methyl-imidazole, N-(3-Aminopropyl)-imidazole, pyrazole, niacinamide, bipyridine, phenanthroline.

4. The method according to claim 1, wherein the concentration of the Cr(III) complex is in the range of 2 mM and 2 M.

5. The method according to claim 1, wherein the acid in the etching bath is selected from sulfuric acid, aminosulfuric (sulfamic) acid, phosphoric acid, diphosphoric acid, metaphosphoric acid, polyphosphoric acid, methanesulfonic acid, acid ethanesulfonic acid, propanesulfonic acid, benzenesulfonic acid, toluenesulfonic acid, cumenesulfonic acid, alkylbenzenesulfonic acids, monoalkylphosphoric acids, dialkylphosphoric acids, isethionic acid, perchloric acid, chloric acid, nitric acid, trifluoromethanesulfonic acid, trifluoroacetic acid, tetrafluoroboric acid, hexafluorophosphoric acid, hexafluorosilicic acid, hydrofluoric acid, boric acid or mixtures thereof.

6. The method according to claim 1, wherein the percentage by weight of acids is comprised between 65 and 98 wt. %.

7. The method according to claim 1, wherein the etching temperature is comprised between 10° C. and 95° C.

8. The method according to claim 1, wherein the etching time is comprised between 30 seconds and 1 hour.

9. The method of claim 1, wherein the organic coating of polymer materials is by organic-based paint, varnish or coating.

* * * * *